(No Model.)
J. H. MAY & F. KING.
SECONDARY BATTERY.
No. 583,810. Patented June 1, 1897.
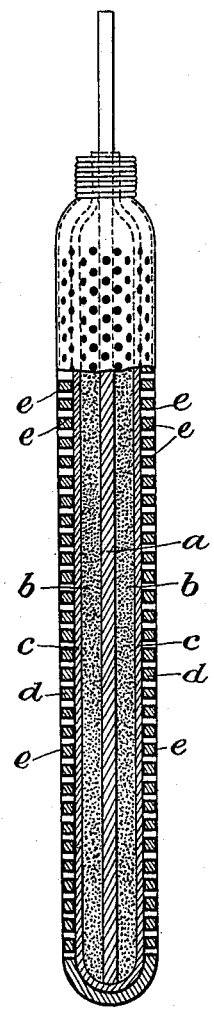
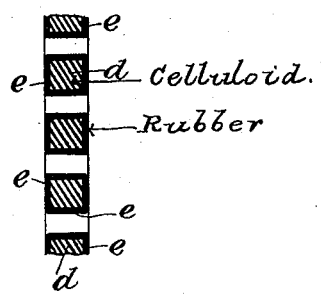
Witnesses
Inventors
Joseph H. May
Frank King
by their attorneys

UNITED STATES PATENT OFFICE.

JOSEPH H. MAY AND FRANK KING, OF LONDON, ENGLAND, ASSIGNORS TO JOHN IRVING COURTENAY, OF SAME PLACE.

SECONDARY BATTERY.

SPECIFICATION forming part of Letters Patent No. 583,810, dated June 1, 1897.

Application filed January 26, 1897. Serial No. 620,810. (No model.)

*To all whom it may concern:*

Be it known that we, JOSEPH H. MAY, electrician, residing at West Ferry Road, Millwall, and FRANK KING, engineer, residing at 4 Great Winchester Street, London, England, subjects of the Queen of Great Britain and Ireland, have invented certain Improvements in or Connected with Secondary Batteries, of which the following is a specification.

This invention has reference to the covers or envelops employed to retain the active material upon the plates of lead secondary batteries; and the object of this invention is to provide such covers or envelops as are not liable to be dissolved or injuriously acted upon by the electrolyte in which they are immersed or by the gases evolved during the working of the battery or by contact with the peroxid. According to this invention the said covers or envelops (which may be of celluloid or other suitable material) are covered with india-rubber in such a manner that the said india-rubber adheres firmly to the material of the cover or envelop.

Figure 1 of the accompanying drawings represents in section an element comprising this invention, and Fig. 2 is a section of part of the cover or envelop drawn to a larger scale.

$a$ is the grid or support; $b$, the active material; $c$, a porous covering of silicated asbestos, for example, and $d$ is a perforated cover or envelop. $e$ is the adherent india-rubber, applied as aforesaid to the said cover or envelop $d$. The cover or envelop and the india-rubber solution employed may be either hot or cold, and the solution may be applied in any suitable way—for example, by dipping or by painting or by squirting or spraying. To prevent danger of the india-rubber becoming detached from the material of the cover or envelop, it is preferred to treat the material of the cover or envelop with a solvent therefor, so as to render it sticky or in such a condition that the india-rubber will adhere firmly thereto. The solvent used for the india-rubber is preferably one which readily volatilizes—such, for example, as coal-naphtha, commonly called "benzol." The solution of india-rubber can be applied once or any number of times, in accordance with the thickness of india-rubber desired. Any india-rubber solution which may form a film over and thus close or cover the perforations of the envelop can be removed by means of a strong current or blast of air directed against the surface of the said envelop while the india-rubber solution is still soft.

Having now particularly described and ascertained the nature of this invention and in what manner the same is to be performed, we declare that what we claim is—

1. In or for a secondary battery, an element comprising a conducting plate or support, active material thereon, and a cover or envelop for retaining the active material upon the plate or support, said cover or envelop having an adherent coating of india-rubber to protect it from injurious action by the electrolyte of the battery or by the gases evolved during the working of the battery, substantially as described.

2. The herein-described method of applying a coating of india-rubber to a cover or envelop for secondary batteries, consisting in first treating said cover or envelop with a solvent of the material composing it, and applying to it while in a soft condition a coating of india-rubber, substantially as described.

In testimony whereof we have signed our names to this specification in the presence of two subscribing witnesses.

JOSEPH H. MAY.
FRANK KING.

Witnesses:
WILLIAM F. UPTON,
WM. JOHN WEEKS.